United States Patent [19]

Okita et al.

[11] Patent Number: 4,874,636
[45] Date of Patent: Oct. 17, 1989

[54] METHOD FOR PREPARING MAGNETIC RECORDING MEDIUM

[75] Inventors: Tsutomu Okita; Hiromi Nakahara; Hiroshi Ogawa, all of Kanagawa, Japan

[73] Assignee: Fuji Photo Film Co., Ltd., Kanagawa, Japan

[21] Appl. No.: 253,637

[22] Filed: Oct. 6, 1988

[30] Foreign Application Priority Data

Oct. 6, 1987 [JP] Japan ................................ 62-250787

[51] Int. Cl.$^4$ .............................................. B05D 5/12
[52] U.S. Cl. .................................... 427/130; 427/128; 427/366; 427/393.5
[58] Field of Search ............. 427/130, 128, 366, 393.5

Primary Examiner—Bernhard Pianalto
Attorney, Agent, or Firm—Sughrue, Mion, Zinn, Macpeak & Seas

[57] ABSTRACT

A method for preparing a magnetic recording medium comprising the steps of: dispersing ferromagnetic particles in a binder solution; coating the resulting magnetic coating composition on a nonmagnetic support to provide a magnetic layer; drying the magnetic layer; and providing a calendering treatment with the magnetic layer, wherein the binder solution comprises at least one compound selected from the group consisting of a polyurethane resin having a tan δ peak temperature of 30° C. or higher as a result of measuring dynamic viscoelasticity, a cellulose acetate butyrate, a cellulose acetate propionate, and a butyral resin; and when the magnetic layer is dried until the solvent content of the magnetic layer is in the range of from 0.1 to 3 wt %, the calendering treatment is provided with the magnetic layer.

7 Claims, No Drawings

METHOD FOR PREPARING MAGNETIC RECORDING MEDIUM

FIELD OF THE INVENTION

The present invention relates to a method for preparing a magnetic recording medium which has excellent surface properties and durability and is suitable for high density recording such as a magnetic tape, a magnetic sheet and a magnetic disk.

BACKGROUND OF THE INVENTION

A method for preparing a magnetic recording medium containing the steps of coating a magnetic coating composition on a nonmagnetic support, sufficiently drying it and then treating it with calendering treatment is known. In this case, the binder used therein includes cellulose derivatives, a copolymer of vinyl chloride and vinyl acetate, polyurethane resins acrylic resins, a copolymer of acrylic acid or methacrylic acid with their esters, a copolymer of vinylidene chloride, synthetic rubbers and polyesters, which are used alone or in combination. It is also known that nitrocellulose is used as a binder and is used in combination with polyol and polyisocyanate to harden a coated film.

A conventional method for preparing a magnetic tape comprises forming a magnetic layer, sufficiently drying it, winding it up, and after a while providing calendering treatment thereon. Another conventional method comprises forming a magnetic layer, drying it completely, and then providing calendering treatment thereon to improve surface properties.

However, if calendering treatment is provided after a magnetic layer is completely dried, as described above, reaction for hardening the magnetic layer has proceeded, and in many cases, surface molding is difficult and thus satisfactory surface properties cannot be obtained. This tendency is prominent particularly when a rapidly hardenable binder is used. Accordingly, high temperature and high pressure are necessary for calendering treatment. But there is a problem that as the temperature and the pressure of a calendering roll is increased, the life of the calendering roll becomes decreased and the rate of calendering treatment also becomes decreased.

In order to solve the above problem, it is proposed that while controlling the amount of residual solvent in a magnetic layer, calendering treatment is provided on the magnetic layer containing an appropriate amount of the solvent as disclosed in JP-A-57-143737 and 61-261819 (the term "JP-A" as used herein refers to a "published unexamined Japanese patent application"). Specifically, in JP-A-57-143737 calendering treatment is provided on a magnetic layer having residual solvent in an amount of from 0.3 to 3 wt % based on a coated layer, and in JP-A-61-261819 calendering treatment is provided on a magnetic layer in an amount of from 20 to 150 $\mu l/m^2$.

JP-A-57-143737 and U.S. Pat. 4,391,851 disclose that calendering treatment is provided using nitrocellulose as a binder and adjusting the residual amount of solvent contained in the magnetic layer. The above method is suitable when a smoothing treatment by calendering is continuously conducted. But as nitrocellulose is used as a binder in that method, several serious problems arise. Namely, there is a high risk of burning and explosion and it is thus difficult to handle nitrocellulose. Further, an extremely large investment for security facilities must be made.

Similar to the above, JP-A-61-261819 also discloses that calendering treatment is conducted while controlling the residual amount of solvent contained in the magnetic layer. However, that method also has similar problems as above, because the method uses similar binders as above and conventional binders are used, and furthermore, satisfactory smoothness suitable for higher density recording cannot be attained by that method.

Recently, higher image qualities have been demanded for a magnetic recording medium. To meet the above requirements, it is necessary that the surface of a magnetic layer should be contacted as closely as possible with a video head or an audio head and surface smoothness should be, therefore, improved. Furthermore, dispersibility of ferromagnetic particles should strikingly be improved.

On the other hand, as the surface of a magnetic layer becomes smoother, the friction in a running system of a video tape recorder increases, running tension also increases, and, therefore, better running durabilities under harsh conditions are more and more required.

SUMMARY OF THE INVENTION

An object of the present invention is to provide a method for safely manufacturing a magnetic recording medium with low cost suitable for high density recording, and which medium has good running durability and its magnetic layer has a smooth surface.

Other objects and effects of the present invention will be apparent from the following description.

In a method for controlling the residual amount of solvent contained in a magnetic layer as described above, it was found by the present inventors that the above object can be attained by using a hard and unusual binder which has not yet been used as a binder for a magnetic recording medium and by providing calendering treatment when a residual amount of solvent reaches a predetermined amount.

That is, the above objects of the present invention can be attained by a method for preparing a magnetic recording medium comprising the steps of: dispersing ferromagnetic particles in a binder solution; coating the resulting magnetic coating composition on a nonmagnetic support to provide a magnetic layer; drying the magnetic layer; and providing a calendering treatment with the magnetic layer, wherein the binder solution comprises at least one compound selected from the group consisting of a polyurethane resin having a tan δ peak temperature of 30° C. or higher as a result of measuring dynamic viscoelasticity, a cellulose acetate butyrate, a cellulose acetate propionate, and a butyral resin; and when the magnetic layer is dried until the solvent content of the magnetic layer is in the range of from 0.1 to 3 wt%, the calendering treatment is provided with the magnetic layer.

DETAILED DESCRIPTION OF THE INVENTION

The binder used in the present invention comprises at least one of the above-described polyurethane resins, cellulose acetate butyrate, cellulose acetate propionate and butyral resins.

The urethane resins for use in the present invention are those having a peak temperature at tan δ at dynamic viscoelasticity (110 Hz) (that is, glass transition point Tg) of 30° C. or higher.

Specific examples of polyurethane having Tg of 30° C. or higher are, for example:

(1) polyurethane comprising diols containing a benzene nucleus, cycloalkane or a heterocyclic ring such as cyclohexane dimethanol, bisphenol A/ethylene oxide (EO) adduct product or p-cresol/EO adduct product as a glycol component, (2) polyurethane comprising an aromatic dicarboxylic acid such as phthalic acid, isophthalic acid or terephthalic acid as the dicarboxylic acid component, (3) polyurethane having a urethane group at a high concentration, and (4) polyurethane in combination with the above examples (1) to (3).

The preferred binder in the present invention is a polyurethane resin having a Tg of 30° C. or higher and the effect of the present invention is particularly remarkable when a urethane resin having a Tg of 45° C. or higher is used. It is desirable to use urethane having a high Tg, since excellent durability can be obtained.

The resin for binder are commercially available in various trade names. Examples of the polyurethane resins include "LIR8200" (aromatic ring containing polyester polyurethane, Tg: 75 ° C., produced by Toyobo Co., Ltd.), "LIR300" (aromatic ring containing polyester polyurethane, Tg: 45° C., produced by Toyobo Co., Ltd.), and "CA118" (alicyclic ring containing polyester polyurethane Tg: 69° C., produced by Morton Co., Ltd). Examples of the cellulose acetate butyrate include "CAB" (Tg: 200° C. or higher, produced by Eastman Kodak Co., Ltd.). Examples of the cellulose acetate propionate include "CAP" (Tg: 200° C. or higher, produced by Eastman Kodak Co., Ltd.). Examples of the butyral resins include "Denka Butyral" (Tg: 80° C., produced by Denka Kagaku Kogyo Kabushiki Kaisha) and "S-Lec" (Tg: 50°-90° C., produced by Sekisui Chemical Co., Ltd.).

The above binders may contain polar groups such as $-CO_2H$, $-CO_2M$, $-SO_3H$, $-SO_3M$, $-OSO_3H$, $-OSO_3M$, $-OPO_3H_2$, $-OPO_3HM$, $-OPO_3M_2$, $-OPO_2h_2$, $-OPO_2M_2$, $-N-$, $-NH_2-$,

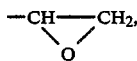

wherein M represents an alkali metal and R represents an alkyl group, in an amount of from $10^{-6}$ to $10^{-4}$ eq/g based on the amount of polymer.

In addition to the above binders, other binders such as vinyl chloride copolymers, aliphatic polyester polyurethanes, polyether polyurethanes, polycaprolactone urethanes, polycarbonate polyurethanes, polyester resins, rubber resins, etc., may be added in an amount of 50 wt% or less based on the total amount of the binders.

Durability can further be improved by adding a polyisocyanate type hardening agent as a part of the binder.

Examples of polyisocyanates include isocyanates such a tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of the above isocyanates and polyalcohols; and polyisocyanates formed by condensation reactions of isocyanates. Polyisocyanate. isocyanurate can also be used.

These polyisocyanates are commercially available in the trade name of "Collonate L", "Collonate HL", "Collonate 2030", "Collonate 2031", "Millionate Mr" and "Millionate MTL" (manufactured by Nippon Polyurethane Co., Ltd.), "Takenate D-102", "Takenate D-110N", "Takenate D-200" and "Takenate D-202" (manufactured by Takeda Chemical Industries, Ltd.), "Desmodule L", "Desmodule IL", "Desmodule N", and "Desmodule HL" (manufactured by Sumitomo Bayer Co., Ltd.) and "T-100" manufactured by Toray Industries, Inc. These can be used alone, or in combination to take advantage of differences in hardening reactivities.

These polyisocyanates are preferably added in an amount of from 5 to 50 wt%,.more preferably from 10 to 45 wt%, most preferably from 15 to 40 wt%, based on the amount of the binder. The calendering treatment used in the present invention may be a conventional treatment carried out by pressing and heating with two or more metal rolls or a combination of metal rolls and elastic rolls made, e.g., of plastics, passing the magnetic recording medium between the rolls and improving the surface properties (gloss, surface roughness, etc.) of the magnetic layer. Upon coating a magnetic coating composition on a support and drying it partially, a calendering treatment is provided particularly when the residual amount of the organic solvent contained in the magnetic coating composition is from 0.3 to 3 wt%, and the calendering treatment is conducted preferably when the residual amount of the organic solvent contained therein reaches from 0.5 to 2.5 wt% while drying the magnetic coating composition. When the residual amount thereof is less than 0.1 wt%, the coated film becomes too hard, and the effect of the calendering treatment is insufficient, resulting in poor surface properties of the magnetic recording medium. When the residual amount thereof exceeds 3 wt%, the coated film tends to stick to the calendering roll, which is dangerous and undesirable. Particularly when the coated film is uneven, it tends to stick to the calendering roll in many cases.

The drying condition to attain such a predetermined residual solvent content before calendering treatment varies depending upon kinds of solvents, amounts of solvents in a coating composition and the residual amounts thereof, and is generally from 40 to 100° C. and the period of time for drying is from about 2 to 5 seconds.

Conditions for calendering treatment depend upon kinds of tapes, residual amounts of solvents and materials for calendering rolls.

The temperature of a calendering roll is preferably from 50 to 150° C. When the temperature is not more than 50° C., surface properties of the magnetic layer are hardly improved in a high speed process, and when the temperature exceeds 150° C., the support undesirably become deformed, shrunken and stretched. The linear pressure is preferably from 80 to 500 kg/cm. When the linear pressure is less than 80 kg/cm, surface properties of the magnetic layer are undesirably hardly improved. And when the linear pressure exceeds 500 kg/cm, mechanical strength of the calendering apparatus is insufficient and the support undesirably becomes deformed.

Drying may also be conducted after the calendering treatment. Drying is conducted generally at from 80 to 120° C. and is preferably carried on until the residual amount of solvents contained in the coated film becomes 0.1 wt% or lower.

As described above, the present invention is preferably employed for a so-called "in-line calendering system" wherein steps from coating to calendering treatment are carried out continuously, and it is also employed for an "off-line calendering system" wherein a magnetic coating composition is coated, a resulting magnetic layer is wound up with a roll and then calendering treatment is provided.

It is preferred in the present invention that the magnetic layer is dried and successively provided with the calendering treatment.

Ferromagnetic particles are used in the magnetic layer of a magnetic recording medium of the present invention.

Examples of the ferromagnetic particles include conventionally known ones such as $\gamma$-$Fe_2O_3$, Co-containing $\gamma$-$Fe_2O_3$, $Fe_3O_4$, Co-containing $Fe_3O_4$, $\gamma$-FeOx, Co-containing $\gamma$-FeOx ($X = 1.33$ to $1.50$), $CrO_2$, Co-Ni-P alloy, Co-Ni-Fe-B alloy, Fe-Ni-Zn alloy, Ni-Co alloy or Co-Ni-Fe alloy. These particles preferably have a particle axis length/axis width is preferably from about 1/1 to 50/1, and the specific surface area thereof is preferably from about 1 to 70 m2/g.

Plate-like hexagonal crystalline barium ferrite can also be used as ferromagnetic particles. The particle diameter thereof is preferably from about 0.001 to 1 $\mu$m, and the thickness thereof is preferably from ½ to 1/20 based on the diameter. The specific gravity thereof is preferably from 4 to 6 g/cc and the specific surface area thereof is preferably from 1 $m^2$/g to 70 $m^2$/g.

The organic solvents used upon coating include ketones such as acetone, methyl ethyl ketone, methyl isobutyl ketone or cyclohexanone; esters such as methyl acetate, ethyl acetate, butyl acetate, ethyl lactate or monoethyl ether of glycol acetate; tars (aromatic hydrocarbons) such as benzene, toluene or xylene; and chlorinated hydrocarbons such as methylene chloride, ethylene chloride, carbon tetrachloride, chloroform, ethylene chlorohydrin or dichlorobenzene.

Commonly used additives such as antistatic agents (e.g., carbon black), dispersing agents, lubricating agents, or abrasive agents can be added to the above-described magnetic layer, if necessary.

Materials for a nonmagnetic support to be provided with a magnetic layer include polyesters such as polyethylene naphthalate or polyethylene-2,6-naphthalate; polyolefins such as polyethylene or polypropylene; cellulose derivatives such as cellulose triacetate, cellulose diacetate, cellulose acetate butyrate or cellulose acetate propionate; vinyl type resins such as polyvinyl chloride or polyvinylidene chloride; and plastic films such as polycarbonate, polyimide or polyamide imide.

The coating composition for forming a magnetic layer where the dispersing step is completed is coated on a support by various coating methods such as, for example, an air knife coating method, an air doctor coating method, a blade coating method, a squeeze coating method, an impregnating coating method, a reverse roll coating method, a transfer roll coating method, a gravure coating method, a kiss coating method, a cast coating method or a spray coating method.

A magnetic layer thus provided on a support is generally subjected to orientation, dried so that the residual amount of solvents falls within the range as defined in the present invention, provided with calendering treatment and then sufficiently dried to obtain a magnetic recording medium.

The present invention is illustrated in more detail by the following examples, and in these examples, all parts are by weight. However, the present invention is not to be construed as being limited to these examples.

EXAMPLES 1 TO 5 AND COMPARATIVE EXAMPLES 1 TO 3

| Formulation for a coating composition: | |
|---|---|
| Co—FeOx (x = 1.44, Hc = 800 Oe, specific surface area: 40 $m^2$/g) | 100 parts |
| Aromatic ring containing polyester polyurethane ("UR 8200", manufactured by TOYOBO Co., Ltd.) | 15 parts |
| Aliphatic polyester polyurethane ("N-2304", manufactured by Nippon Polyurethane Co., Ltd.) | 5 parts |
| Polyisocyanate ("Collonate L-75") | 6.7 parts |
| Butoxy ethyl stearate (for industrial use) | .4 parts |
| Oleic acid (industrial use) | 1 part |
| $\alpha$-Alumina (particle size: 0.3 $\mu$m) | 2 parts |
| Carbon (particle size: 20 m$\mu$) | 1 part |
| Mixed solvent of cyclohexanone/methyl ethyl ketone | 1,000 parts |

The above coating composition was coated on a polyethylene terephalate support having a thickness of 15 $\mu$m, in a dry thickness of 5 $\mu$m, provided with orientation while it was undried, dried for about 3 seconds, and provided with calendering treatment with a linear pressure of 200 kg/cm, at 85° C. for 30 m/min at a state the residual amount of solvents was 2.5 wt%, thereafter dried so that the residual amount of the solvent became 0.02 wt%. Metal calendering rolls were used. The magnetic layer did not stick and lines did not form.

After calendering treatment, the magnetic layer was provided with bulk thermo treatment, hardened and slit to a ½ inch width to prepare a video tape. The characteristics of the thus-obtained tape are shown in Table 3.

Tapes were prepared also using the same procedures as above except the binder composition of Example 1 was changed to those as shown in Table 1.

TABLE 1

| Example 2 | Aromatic ring containing polyester polyurethane ("UR8300" manufactured by TOYOBO Co., Ltd.) | 15 parts |
|---|---|---|
| | "N-2304" | 5 parts |
| | "Collonate L-75" | 6.7 parts |
| Example 3 | Alicyclic ring containing polyester urethane ("CA118" by Morton Co., Ltd.) | 15 parts |
| | "N-2304" | 5 parts |
| | "Collonate L-75" | 6.7 parts |
| Example 4 | Cellulose acetate butyrate "CAB" manufactured by Eastman Kodak Co., Ltd.) | 15 parts |
| | "N-2304" | 5 parts |
| | "Collonate L-75" | 6.7 parts |
| Example 5 | Butyral resin ("Denka butyral 3000K") | 15 parts |
| | Aliphatic polyurethane ("N-2301" by Nippon Polyurethane Co., Ltd.) | 5 parts |
| | "Collonate L-75" | 6.7 parts |
| Comparative Example 1 | "N-2301" | 20 parts |
| | "Collonate L-75" | 6.7 parts |

In Comparative Examples 2 and 3, magnetic layers which had residual amount of solvents as shown in Table 2 as a result of changing the drying speed rate, were provided with calendering treatment under the same calendering condition as in Example 1, and then dried so that the residual amount of solvents was 0.02 wt%.

TABLE 2

| Example No. | Residual Amount of Solvents |
|---|---|
| Comparative Example 2 | 0.02 wt % |
| Comparative Example 3 | 3.50 wt % |

EXAMPLE 6

The same procedure as in Example 1 was repeated to prepare a video tape except that the residual amount of solvents was 0.5 wt%.

Tg of urethane as used in examples and comparative examples is as follows.

| Urethane Resin | Tg (°C.) |
|---|---|
| UR 8200 | 75 |
| UR 8300 | 45 |
| N-2304 | −13 |
| CA-118 | 69 |
| N-2301 | −20 |

TABLE 3

| Example No. | Gloss | Still Durability (time) | YC/N (dB) |
|---|---|---|---|
| Example 1 | 195 | 60 min. or higher | ±1.5 |
| Example 2 | 196 | 60 min. or higher | ±1.5 |
| Example 3 | 190 | 60 min. or higher | ±1.4 |
| Example 4 | 187 | 60 min. or higher | ±1.0 |
| Example 5 | 184 | 60 min. or higher | ±1.1 |
| Example 6 | 182 | 60 min. or higher | ±1.0 |
| Comparative Example 1 | 182 | 2 min. Head stain occurred. | −3.0 |
| Comparative Example 2 | 168 | 60 min. or higher | ±0.0 |
| Comparative Example 3 | — | Magnetic layer stripped off, and calender also stained. | — |

YC/N: The ratio between video signals at 6 MHz and modulated noise at 5 MHz. Measuring apparatus: "BR-7000" by JVC
Gloss: Gloss was measured using a gloss meter by illuminating light at an angle of incidence of 45° in the machine direction. Measuring apparatus: Gloss meter GK-45D, manufactured by Suga Co., Ltd.
Still Durability: Using a VHS video tape recorder ("NV 8200" manufactured by Matsushita Electric Industrial Co., Ltd.), video signals were recorded on video tapes (each sample), and still durability is shown in terms of period of time for still images to lose theri clarity when signals were reproduced at 23° C. and 60% relative humidity (RH).

As is clear from the above results, the video tape prepared by using the binder having the binder composition as defined in the present invention, drying the magnetic layer so that the residual amount of solvents contained in the magnetic layer was adjusted as defined in the present invention and providing it with calendering treatment exhibits more excellent gloss, still durability and YC/N than the video tape prepared by using binders other than the binders as defined in the present invention (Comparative Example 1) and the video tapes using binders having the binder composition as defined in the present invention and having calendering treatment with the residual amount of solvents in the range outside that as defined in the present invention (Comparative Examples 2 and 3).

While the invention has been described in detail and with reference to specific embodiments thereof, it will be apparent to one skilled in the art that various changes and modifications can be made therein without departing from the spirit and scope thereof.

What is claimed is:

1. A method for preparing a magnetic recording medium comprising the steps of: dispersing ferromagnetic particles in a binder solution; coating the resulting magnetic coating composition on a nonmagnetic support to provide a magnetic layer; drying said magnetic layer; and providing a calendering treatment with said magnetic layer, wherein said binder solution comprises at least one compound selected from the group consisting of a polyurethane resin having a tan δ peak temperature of 30° C. or higher as a result of measuring dynamic viscoelasticity, a cellulose acetate butyrate, a cellulose acetate propionate, and a butyral resin; and when said magnetic layer is dried until the solvent content of said magnetic layer is in the range of from 0.1 to 3 wt%, said calendering treatment is provided with said magnetic layer.

2. A method for preparing a magnetic recording medium as claimed in claim 1, wherein said magnetic layer is dried and successively provided with said calendering treatment.

3. A method for preparing a magnetic recording medium as claimed in claim 1, wherein said binder solution comprises a polyurethane resin having a tan δ peak temperature of 30° C. or higher as a result of measuring dynamic viscoelasticity.

4. A method for preparing a magnetic recording medium as claimed in claim 1, wherein said binder solution further comprises an isocyanate hardening agent.

5. A method for preparing a magnetic recording medium as claimed in claim 1, wherein said calendering treatment is provided with said magnetic layer, when said magnetic layer is dried until the solvent content of said magnetic layer is in the range of from 0.3 to 3 wt%.

6. A method for preparing a magnetic recording medium as claimed in claim 1, wherein during said calendering treatment, the calendering temperature is from 50 to 150° C.

7. A method for preparing a magnetic recording medium as claimed in claim 1, wherein during said calendering treatment, the linear pressure is from 80 to 500 kg/cm.

* * * * *

UNITED STATES PATENT AND TRADEMARK OFFICE
CERTIFICATE OF CORRECTION

PATENT NO. : 4,874,636
DATED : October 17, 1989
INVENTOR(S) : Okita, et al.

It is certified that error appears in the above-identified patent and that said Letters Patent is hereby corrected as shown below:

At line 22 of column 8 (line 9 of claim 1), delete "tan 6" and insert therefor -- tan δ --.

At line 36 of column 8 (line 3 of claim 3), delete "tan 6" and insert therefor -- tan δ --.

Signed and Sealed this

Thirteenth Day of November, 1990

Attest:

HARRY F. MANBECK, JR.

Attesting Officer        Commissioner of Patents and Trademarks